(12) United States Patent
Choi

(10) Patent No.: US 6,442,201 B2
(45) Date of Patent: *Aug. 27, 2002

(54) DOWN CONVERSION DECODING DEVICE OF DIGITAL TELEVISION

(75) Inventor: Seung Jong Choi, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,605

(22) Filed: Aug. 5, 1998

(30) Foreign Application Priority Data

Aug. 13, 1997 (KR) .............................................. 97-38574

(51) Int. Cl.$^7$ ................................................. H04B 1/66

(52) U.S. Cl. ................................................. 375/240.12

(58) Field of Search ................................. 348/392, 699, 348/384, 400, 415; 382/232; 375/240; 341/82

(56) References Cited

U.S. PATENT DOCUMENTS

| | | | | | |
|---|---|---|---|---|---|
| 5,227,878 A | * | 7/1993 | Puri et al. | .................... | 348/699 |
| 5,563,660 A | * | 10/1996 | Tsukagoshi | .................. | 348/384 |
| 5,682,441 A | * | 10/1997 | Ligtenberg et al. | ......... | 382/232 |
| 5,751,357 A | * | 5/1998 | Geib | ........................... | 348/400 |
| 5,781,239 A | * | 7/1998 | Mattela et al. | .............. | 348/415 |
| 6,222,467 B1 | * | 4/2001 | Moon | ........................... | 341/82 |

* cited by examiner

Primary Examiner—Chris Kelley
Assistant Examiner—Allen Wong
(74) Attorney, Agent, or Firm—Fleshner & Kim, LLP

(57) ABSTRACT

The disclosure is a down conversion decoding device of the digital television having an effect capable of obtaining a picture of the high quality no less than that of the full-memory version while reducing the size of the memory, by changing the size of the required memory according to the type of the frame to be input after the DCT coefficients are horizontally filtered. Furthermore, if the display format is the sequential scanning, there is no need to perform the vertical filtering and decimation for the I and P frames thereby, enhancing the picture quality and also, the format conversion unit can perform the only first interpolation without the additional interlacing process thereby, reducing the size of the memory in the format conversion unit.

27 Claims, 4 Drawing Sheets

DOWN CONVERSION DECODING DEVICE OF DIGITAL TELEVISION

BACKGROUND OF THE INVENTION

1. Field of the Invention

The present invention relates to a digital television DTV, and more particularly to a down conversion decoding device of the DTV differentially applying a memory according to a type of a picture upon a down conversion.

2. Discussion of Related Art

Generally, a picture compressing and restoring technique for a moving picture experts group MPEG has been becoming an essential technique in the multi-media age, and has been a standard of a digital versatile disc DVD and a digital television DTV, etc.

At present, the MPEG compressing and restoring of a high definition HD degree has been considered as the standard or a real standard in the DTV.

This means that an existing analog television of NTSC, etc., is increasingly being substituted by the digital television.

However, it is estimated that demand for the analog television of a standard definition SD degree will be lasted for a long time due to a high price of the high definition television HDTV during the NTSC type analog television is completely substituted with the HDTV.

Here, the SDTV does not display a signal of the HDTV on a monitor of the HD degree, but down-converts a HD signal to display it on the popularized monitor of the SD degree. That is, it means the TV displaying (the down-converted HD signal) on the NTSC TV or a settop box, and also, it can receive the signal of the SD degree.

For example, the SDTV can lower the HD signal of a 1920×1080 60 Hz interlaced scanning method to the SD signal a 720×480 60 Hz interlaced scanning method to display it, and also, can display the SD signal of the 720×480 60 Hz interlaced scanning method without conversion.

However, the MPEG-2 is generally being used as a compressing method of the DTV signal, and the compressing method applying the MPEG-2, that is, a grand-alliance method, was adopted in U.S.A, but, the problem of this method is that the signal of the HDTV is not scalable based upon an MP@HL of the MPEG-2.

Here, the scalable picture compressing method can largely be applied in a spatial domain, a temporal domain and a signal-to-noise ratio SNR domain.

At this time, the SDTV requires a scalability in the spatial domain, which make it possible for the receiver to perform a desired reception according to the display size thereof, by adding a bit stream which compressed a different signal between the HD signal and SD signal to the SD bit stream after selecting the signal of the SD degree in signals of the HD degree to make a firstly compressed bit stream, upon compression of the HDTV signal.

Meanwhile, the signal type of the grand-alliance is not scalable and therefor, the receiver regularly performs a decoding upon displaying the HD signal to the HD degree, but, it requires a special method capable of down-converting the HD signal to the SD upon displaying the HD signal to the SD degree.

On the other hand, there is no an algorism set in the MPEG and grand-alliance standard and therefor, a TV receiver manufacturer is using his own method.

In FIG. 1 showing a block diagram of a video decoding device of the DTV, a video decoding device 10 is formed of: a variable length decoding VLD unit 11 variable length decoding a discrete cosine transform DCT coefficients and a motion vector MV, etc., in a bit stream which was compressed and transmitted to output it; an inverse scan unit 12 inversely scanning the DCT coefficients decoded in the VLD unit 11; an inverse quantization unit 13 inversely quantizing the inversely scanned DCT coefficients; a 8×8 inverse discrete cosine transform IDCT unit 14 performing the inverse discrete cosine transform for values inversely quantized in the inverse quantization unit 13 to output them as spatial pixel values; a frame memory unit 15 storing standard frames; a motion compensation unit 16 reading pixel values from the frame memory unit 15 to compensate movement with motion vectors MV output from the VLD unit 11; and an adder 17 adding the value obtained from the motion compensation unit 16 and pixel value converted in the 8×8 IDCT unit 14 to decode it to an original pixel. Here, an output of the adder 17 is input to the frame memory unit 15 to be stored.

In the video decoding device 10 having the aforesaid configuration, the VLD unit 11 valid length decodes the DCT coefficient and the motion vector, etc., in the compression bit stream to be input to output them.

And, the inverse scan unit 12 inversely scans the DCT coefficients decoded in the VLD unit 11 and after that, inversely quantizes them through the inverse quantization unit 13 to output them to the 8×8 IDCT unit 14.

The 8×8 IDCT unit 14 performs the IDCT for the inversely quantized values to transform them to the spatial values and after that, outputs the transformed values to the motion compensation unit 16.

The motion compensation unit 16 reads pixel value from the frame memory unit 15 according to the motion vectors MV output from the VLD 11 and the frame mode to compensate the motion and after that, outputs it to the adder 17. The adder 17 adds the value obtained from the motion compensation unit 16 and pixel value transformed in the 8×8 IDCT unit 14 to output it. At this time, an output of the adder 17 is fedback to the frame memory unit 15 to be stored.

Here, for an frame I, the motion compensation is not used and the decoding is performed only by the IDCT, but, for a P frame and a B frame, decoding performed while the motion compensation is used, together with the IDCT.

To down-convert the HD signal output from the decoding device of the DTV to the SD degree, the IDCT part and the motion compensation part are all changed, and the size of the frame memory of the frame memory unit 15 is changed according to the algorism.

Generally, the frame memory is classified into a full-memory version, a half-memory version and a quarter-memory version according to the size thereof, and each of them performs the decoding as the following Table 1.

TABLE 1

|  | IDCT | motion vector used upon motion compensation | after-process |
|---|---|---|---|
| full-memory | 8 × 8 | (MVx, MVy) | vertical and horizontal filtering and decimation |
| half-memory | 4 × 8 | (MVx/2, MVy) | vertical filtering and decimation |
| quarter-memory | 4 × 4 | (MVx/2, MVy/2) | unnecessary |

Each memory version shown in the aforesaid Table 1 will be explained with reference to attached FIGS. 2 to 4.

First, in FIG. 2 which is a block diagram of the decoding device in case of the full-memory version upon general down conversion, the decoding device of FIG. 2 is formed of the HDTV decoder 10, horizontal low pass filter LPF 20, horizontal ½ down sampling unit 30, a vertical LPF unit 40, and a vertical ½ down sampling unit 50.

In FIG. 2, when the frame memory unit 15 is the full-memory version, the HDTV decoder 10 has the configuration as shown in FIG. 1, and the picture of the HD degree output from the HDTV decoding unit 10 is input to the horizontal LPF unit 20, and a low pass filtering is horizontally performed.

After that, filtered data is horizontally ½ decimated through the horizontal ½ down sampling unit 30.

And, data horizontally decimated in half is vertically low pass filtered through the vertical LPF unit 40 and after that, is vertically decimated in half through the vertical ½ down sampling unit 50.

At this point, the full-memory version may obtain the highest quality of video, but, since the required size of the frame memory is the same as the HDTV and also, the horizontal and vertical low pass filtering are required after the HD decoding, a hardware is more complicate than the HDTV receiver and accordingly, it is generally used only as a Benchmark comparing performance of different HDTV down conversion algorisms.

FIG. 3 is a diagram showing a down sampling operation using a general filter, and FIG. 4 is a block diagram of the decoding device in case of the half-memory version during the general down conversion.

The half-memory version performs the decoding to the picture smaller size than the HD degree upon decoding the HD bit stream, for solving the complexity of the full-memory version.

In other words, the decoding device in case of the half-memory version as shown in FIG. 4 has the VLD unit 11, the inverse scan unit 12 and the inverse quantizing unit 13 as shown in FIG. 1, and inversely discrete cosine transforms only a part of the inversely quantized 8×8 DCT coefficient through a filtering and 4×8 IDCT unit 41, thereby performing the down sampling.

The filtering and 4×8 IDCT unit 41 is formed of a filter 34 discarding a part of a horizontal high frequency part as shown in FIG. 3b, and a 4×8 IDCT unit 35 performing the IDCT for an output of the filter unit 34. Here, the filter 34 may be referred to as a zonal filter.

For example, if 8×8 IDCT coefficient is input to the general 8×8 IDCT unit 14 as shown in FIG. 3a, 8×8 pixel values may be obtained, but, if it is input to the filtering and 4×8 IDCT unit 41 as shown in FIG. 3b, the filter unit 34 leaves only 4×8 part corresponding to a horizontal low frequency part and discards the rest high frequency part, thereby performing the down sampling. And, if the rest 4×8 IDCT coefficient is input to the 4×8 IDCT part 35 and 4×8 IDCT is then performed, only 4×8 pixel values are obtained. As a result, we can know that the 8×8 IDCT coefficient is horizontally down-sampled in half while passing the 4×8 IDCT unit 41.

Since the size of the picture is reduced through the horizontal ½ down sampling, the motion vectors are input to the motion compensation unit 43 after being respectively scaled according to the reduced size in the vector scaling unit 43.

The motion compensation unit 43 performs the motion compensation of the half-memory version with the motion vectors which were scaled in the motion vector scaling unit 43 to be output.

Further, in case of the quarter-memory version, only 4×4 part corresponding to the low frequency part in the 8×8 IDCT coefficient is left and the rest are discarded, through the filter upon the decoding. And, the 4×4 IDCT is performed only with the rest 4×4 parts, thereby obtaining 4×4 pixel values. Resultingly, the aforesaid shows that ½ down sampling is horizontally and vertically performed.

If the horizontal and vertical ½ down sampling are performed, the size of the picture is reduced and therefore, the motion vectors are respectively scaled correspondingly to the size thereof through the motion vector scaling.

That is, in the quarter-memory version, the size of the frame is reduced in half on the horizontal axis and vertical axis and therefor, the motion vector has to be scaled in half on the horizontal axis and vertical axis as MVx/2 and MVy/2 of the Table 1.

As mentioned above, the conventional down conversion decoding device is divided according to the size of the frame memory, and the capacity thereof is largely changed as whether an input signal is the interlaced scanning or a sequential scanning. In case of the interlaced scanning, the half-memory version exhibits the capacity corresponding to the full-memory version, but, the capacity of the quarter-memory version is insufficient. Furthermore, in case of the quarter-memory version, the memory may be reduced in the decoding device but, a format transform unit (not shown) connected to a rear part of the decoding unit requires many additional memory for the interlacing.

And, in case of a moving picture that a display format is the sequential scanning, the quarter-memory version shows a pretty good capacity, but on the other hand, in case that it is the interlaced scanning, there are many problems. Accordingly, to improve the capacity of the quarter-memory version, an interpolation of a high order is performed, but, since the major part of information was lost upon the filtering, there is a problem that the quality of the picture is deteriorated.

SUMMARY OF THE INVENTION

Accordingly, the present invention is directed to a down conversion decoding device of a digital television that substantially obviates one or more of the problems due to limitations and disadvantages of the related art.

An object of the present invention is to provide a down conversion device of a digital television reducing a size of a memory by changing a use of a memory according to a type of a picture upon a down conversion.

Another object of the present invention is to provide a down conversion device of a digital television capable of enhancing an picture quality by using a discrete cosine transform coefficient discarded through a filtering for an interpolation upon a motion compensation.

Further another object of the present invention is to provide a down conversion decoding device of a digital television easily performing an interlacing function through a down conversion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a down conversion decoding device of a digital television in accordance with the present invention applies advantages of a half-memory version method and a quarter-memory version method with the characteristic of a compressing method of I, B and P frames.

In other words, since I and P frames are used standard frames for a motion compensation, they are decoded with the half-memory version, and the B frame is decoded with the quarter memory.

Thus, the down conversion decoding device of the digital television is formed of: an input signal processing unit decoding discrete cosine transform coefficient of bit stream to be input and motion vectors, etc., performing an inverse quantization and an inverse discrete cosine transform for only given coefficient after inversely scanning decoded discrete cosine transform coefficient; a motion compensation unit performing a motion compensation according to a type of the motion vector decoded in the input signal processing unit and the inversely discrete cosine transformed frame; a frame storing unit having different sizes according to characteristics of the input frame, and storing frames motion compensated in the motion compensation unit; and a format selecting unit filtering a corresponding frame stored in the frame storing unit according to a display format, or, outputting the corresponding frame as it is.

The input signal processing unit is formed of: a variable length decoding unit decoding the discrete cosine transform coefficient, forward motion vector and backward motion vector in compressed bit stream to output them; an inverse scanning and filtering unit inversely scanning discrete cosine transform coefficient decoded in the variable length decoding unit, leaving discrete cosine transform coefficient corresponding to a low frequency in inversely scanned discrete cosine transform coefficient, and discarding the rest coefficient of a high frequency part; an inverse quantization unit inputting discrete cosine transform coefficient corresponding to the low frequency left in the inverse scanning and filtering unit to quantize them; and an inverse discrete cosine transform unit inversely discrete cosine transforming discrete cosine transform values inversely quantized in the inverse quantization unit, and transforming them to spatial pixel values to output them.

The inverse scanning and filtering unit leaves only discrete cosine transform coefficient of 4×8 part corresponding to a horizontal low frequency part in 8×8 discrete cosine transform coefficients inversely scanned in the inverse scanning and filtering unit, and outputs the rest high frequency part to the motion compensation unit.

The inverse discrete cosine transform unit inputs inversely quantized 4×8 discrete cosine transform values to perform 8×8 IDCT.

The inverse discrete cosine transform unit performs 16×8 discrete cosine transform to perform 8×8 filtering, after collecting two horizontal 8×8 blocks and performing 8×8 inverse discrete cosine transform, respectively.

The motion compensation and frame storing units are formed of: a frame buffer storing I frame output from the input signal processing unit or a motion compensated P frame; a uni-directional motion compensation unit adding P frame coefficient values output from the input signal processing unit to the motion compensated pixel values to store it in the frame buffer, after compensating the motion with the forward motion vector output from the input signal processing unit and the standard frame stored in the frame buffer; a bi-directional motion compensation unit compensating the motion with the forward motion vector and the backward motion vector output from the input signal processing unit, and with I and P frames stored in the frame buffer or two P frames; 4×4 converting unit sub sampling 4×8 coefficient of the B frame output from the input signal processing unit to 4×4 coefficient to output it; and a B frame buffer adding pixel values motion-compensated in the bi-directional motion compensation unit and 4×4 coefficient values converted in the 4×4 converting unit to store them, and after that, outputting them.

The uni-directional and bi-directional motion compensation units analyze discrete cosine transform coefficient of the high frequency part discarded from the inverse scanning and filtering unit to determine an interpolation order.

In case that the frame output from the inverse quantizing unit is the B frame, a 4×4 filtering and inverse discrete cosine transform unit is additionally provided instead of the 4×8 IDCT unit and 4×4 converting unit.

The picture quality can be enhanced while reducing the size of the memory required for the down decoding device of the digital television,.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
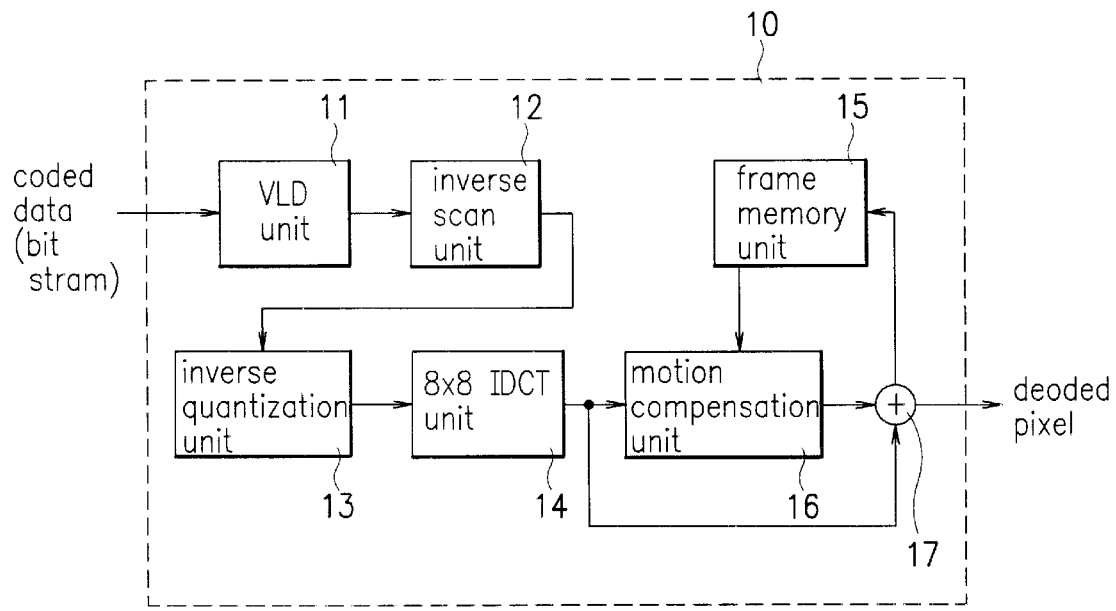
FIG. 1 is a block diagram of a general video decoding device of a digital television.
Figure 2:
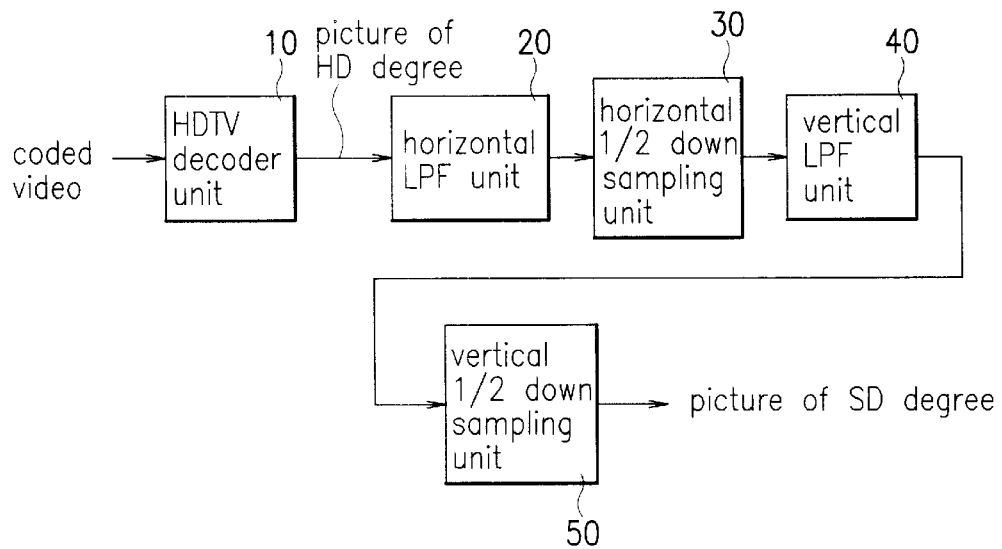
FIG. 2 is a block diagram of a decoding device in case of a full-memory version during a general down conversion.
Figure 3:
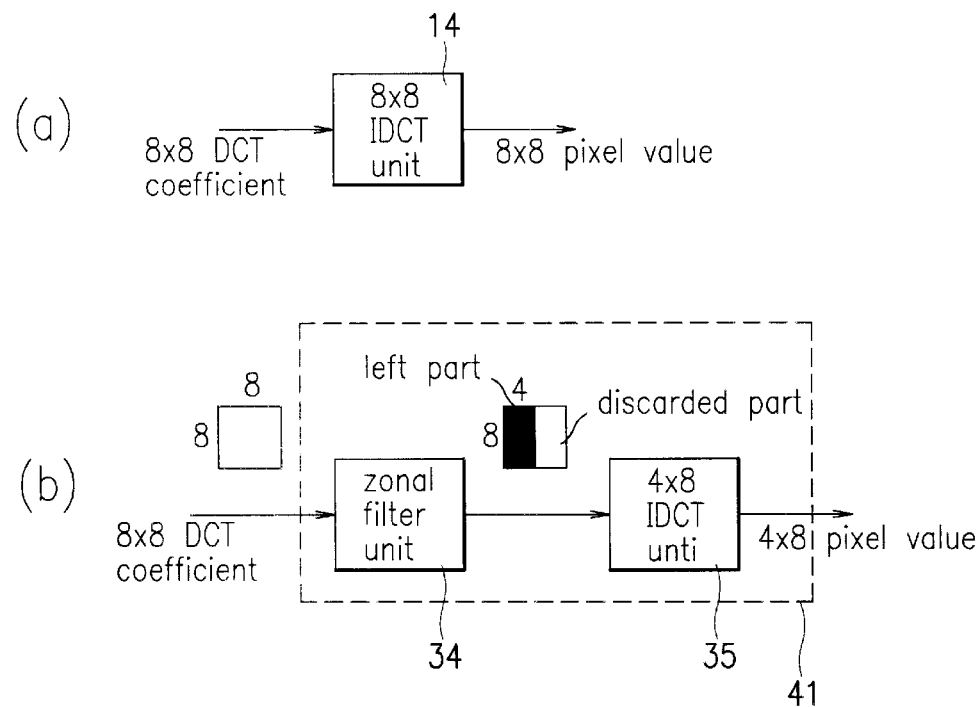
FIG. 3a is a block diagram of a general 8×8 IDCT unit.
FIG. 3b is a block diagram of a filtering and 4×8 IDCT unit for a down sampling.
Figure 4:
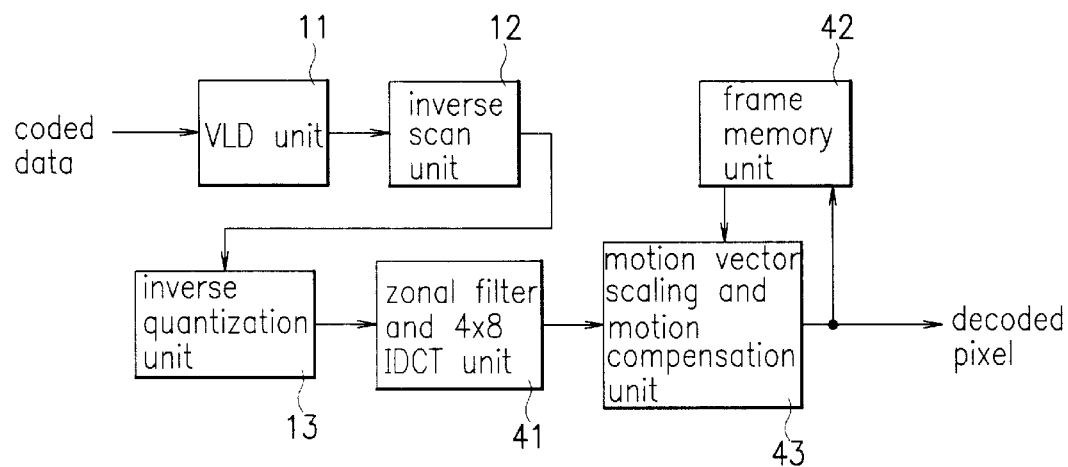
FIG. 4 is a block diagram of a decoding device in case of a half-memory version during the general down conversion.
Figure 5:
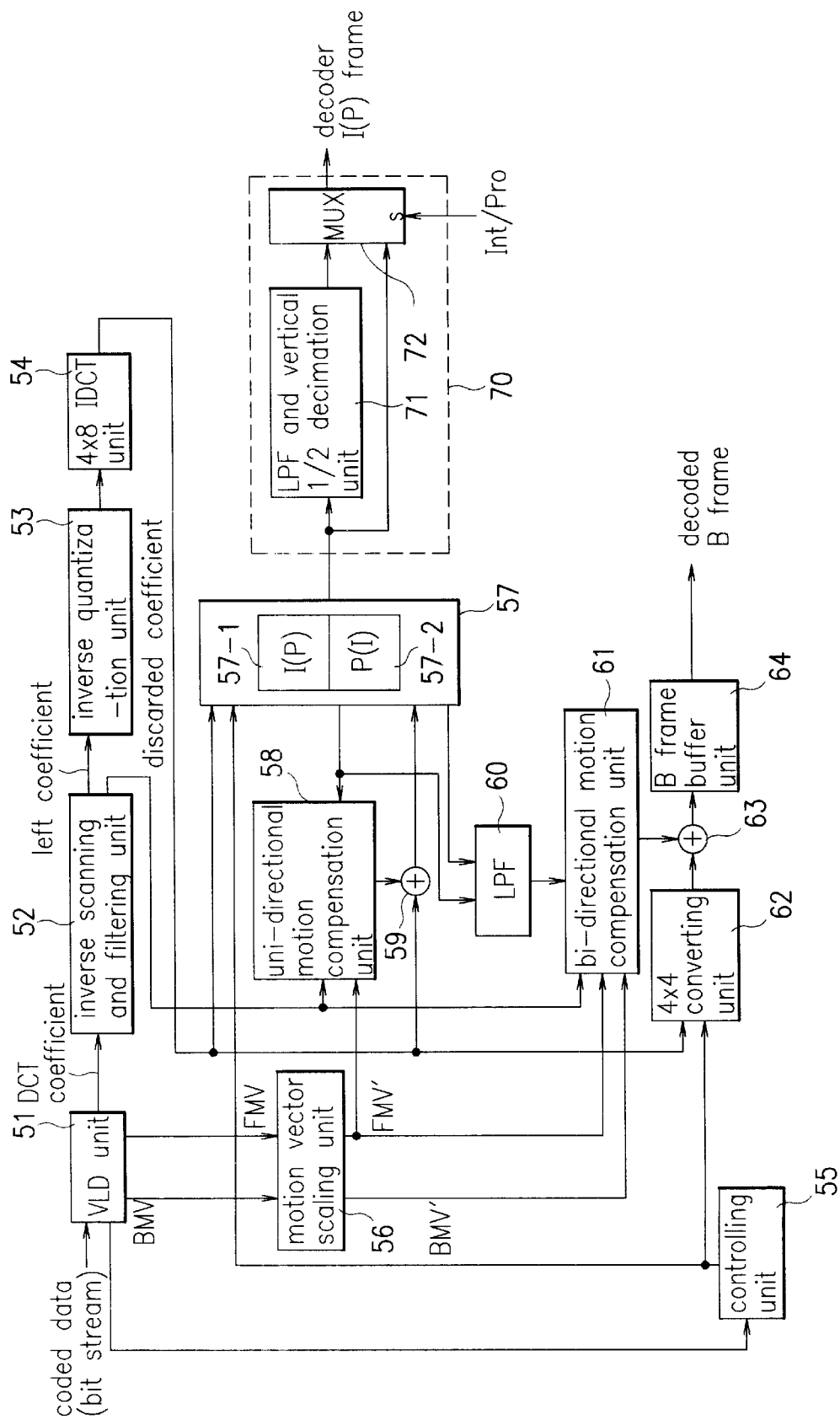
FIG. 5 is a block diagram of a down conversion decoding device of a digital television in accordance with the present invention.

In FIG. 5 showing a down conversion decoding device of a digital television in accordance with the present invention, the, the down conversion decoding device is formed of a variable length decoding VLD unit 51, an inverse scanning and filtering unit 52, an inverse quantization unit 53, 4×8 inverse discrete cosine transform IDCT unit 54, a controlling unit 55, a motion vector scaling unit 56, a frame buffer 57, a uni-directional motion compensation unit 58, an adder 59, a low pass filter LPF 60, a bi-directional motion compensation unit 61, 4×4 converting unit 62, an adder 63, a B frame buffer 64, and a format selecting unit 70. The VLD unit 51 performs a variable length decoding for DCT coefficient, forward motion vector FMV and backward motion vector BMV in compressed bit stream to output them, and the inverse scanning and filtering unit 52 inversely scans DCT coefficient decoded in the VLD unit 51, leaves 4×8 part corresponding to a horizontal low frequency part in inversely scanned 8×8 DCT coefficient, and discards the rest horizontal high frequency part. The inverse quantization unit 53 inputs 4×8 part corresponding to the left horizontal low frequency part to quantize them, and the 4×8 IDCT unit 54 transforms an inverse discrete cosine transform for the 4×8 DCT values inversely quantized in the inverse quantization unit 53, and outputs them as partial pixel values. The controlling unit 55 outputs vertical and horizontal positions of DCT coefficient to be currently decoded in VLD unit 51, frame ratio and control signals in accordance with states of the I, B and P frames. The motion vector scaling unit 56 scales each of FMV and BMV output from the VLD unit 51 under the control of the controlling unit 55, and the frame buffer 57 stores the I frame output from the 4×8 IDCT unit 54, or, the motion-compensated P frame, according to the control of the controlling unit 55. The uni-directional motion compensation unit reads a standard frame from the frame buffer 57 to compensate the motion with coefficients corresponding to the horizontal high frequency discarded from the inverse scanning and filtering unit 52 and with the FMW' scaled in the motion vector scaling unit 56. The adder 59 inputs the frame motion-compensated in the uni-directional motion compensation unit 58 and the P frame output from the 4×8 IDCT unit 54 under the control of the controlling unit 55, and adds them to output it to the frame buffer 57. The LPF 60 inputs two frames (i.e., I and P frames, two P frames) output from the frame buffer 57 to perform the low pass filtering, and the bi-directional motion compensation unit 61 compensates the motion of the frame filtered in the LPF 60 with the coefficient corresponding to the horizontal high frequency discarded from the inverse scanning and filtering unit 52 and with FMV' and BMV' scaled in the motion vector scaling unit 56. The 4×4 converting unit 62 inputs the B frame from the 4×8 IDCT unit 54 to sub sample 4×8 coefficients to the 4×4 coefficient under the control of the controlling unit 55, and, the adder 63 adds the frame motion-compensated in the bi-directional motion compensation unit 61 and 4×4 coefficient converted in the 4×4 converting unit 62. The B frame buffer 64 outputs the decoded B frame after storing an output of the adder 63, and, the format selecting unit 70 vertically decimates I or P frame output from the frame buffer 57 according to the display format, or, outputs it as it is. Here, the frame buffer 57 has the size capable of storing two frames, and for the sake of convenience, each area thereof will be referred to as a first frame buffer 67-1 and a second frame buffer 57-2. Two frame areas 57-1 and 57-2 store I or P frame, alternatively.

The format selecting unit 70 is formed of: an LPF and vertical ½ decimation unit and a multiplexer 72. The LPF and vertical ½ decimation unit vertically low pass filters I or P frame data output from the frame buffer unit and then, performs the vertical ½ decimation. And the multiplexer 72 chooses an output of the LPF and vertical ½ decimation unit if the display format uses the interlaced scanning method, or, chooses an output of the frame buffer unit if the display format uses the sequential scanning method, and then outputs it to the decoded I or P frame.

In the present invention having the configuration as mentioned above, the VLD unit decodes bit stream to be input and, outputs DCT coefficient and FMV and BMV to the inverse scanning and filtering unit 52 and the motion vector scaling unit, respectively.

The motion vector scaling unit 56 inputs decoded FMV and BMV from the VLD unit, scales in half x-directional motion vector, and outputs y-directional motion vector as it is. By the way, in case that the FMV and BMV output from the VLD unit 51 are used for the motion compensation after the standard frame is up-sampled in the uni-directional motion compensation unit 58 and bi-directional motion compensation unit 61, the motion vector scaling unit 56 is not required.

The inverse scanning and filtering unit 52 performs 4×8 filtering after scanning the DCT coefficient decoded in the VLD 51 to leave only 4×8 DCT coefficient and, outputs coefficient for the remaining discarded horizontal high frequency to the uni-directional motion compensation unit 58 and bi-directional motion compensation unit 61.

The 4×8 DCT coefficient left through the filtering is inversely quantized in the inverse quantization unit 53, and IDCT is performed through the 4×8 IDCT unit 54.

At this time, the 4×8 IDCT unit 54 performs 8×8 IDCT after collecting two blocks of the 8×8 DCT coefficient, respectively. Here, 8×8 filtering may be performed for processing two blocks.

Meanwhile, the controlling unit 55 outputs frame type of data decoded in the present VLD 51, frame ratio and control signals in accordance with the frame of vertical, horizontal and position signal, etc., to the frame buffer 57 and 4×4 conversion unit 62.

That is, if data to be IDCTed in the 4×8 IDCT unit 54 is I frame, the frame buffer unit 57 stores 4×8 pixel values output from the 4×8 IDCT unit 54 under the control of the controlling unit 55.

Data stored in the frame buffer unit 57 is input to the multiplexer 72 through the format selecting unit 70 and LPF and vertical ½ decimation unit 71 and simultaneously with this, is directly input to the multiplexer 72. The LPF and vertical ½ decimation unit 71 performs vertical ½ decimation after low pass filtering the I frame to be input. The low pass filtering of the LPF and vertical ½ decimation unit 71 is performed depending up the type of the input signal, and in case of the interlaced scanning signal, filtering is performed between the same fields, but, in case of the sequential scanning signal, the filtering is performed within the frame.

Further, if data to be currently IDCTed is P frame, data stored in the frame buffer unit 57 is output to the uni-directional motion compensation unit 58 under the control of the controlling unit 55, and if B frame, it is output to the LPF 60. In other words, if data to be IDCTed in the 4×8 IDCT unit 54 is P frame, DCT coefficient corresponding to the horizontal high frequency discarded from the inverse scanning and filtering unit 52 and the I frame stored in the frame buffer unit 57 are input to the uni-directional motion compensation unit 58 under the control of the controlling unit 55.

The uni-directional motion compensation unit 58 compensates the motion of the standard frame output from the frame buffer unit 57 with FMV' scaled in the motion vector scaling unit 56. Here, upon compensating the motion of the uni-directional motion compensation unit 58, compensation is performed by macro blocks while using the DCT coefficient corresponding to the horizontal frequency discarded upon filtering as additional information. That is, the uni-directional motion compensation unit 58 analyzes DCT coefficient discarded upon data interpolation for the motion compensation to determine an interpolation order. For example, as there happen many motions, much real data are included in the discarded DCT coefficients. Accordingly, in this case, the interpolation order is increased for performing a precision interpolation, and since real data is hardly included in the discarded DCT coefficient as the movement is reduced, in this case, the interpolation order is reduced for performing the interpolation. As mentioned above, the discarded coefficient is used for the motion compensation, thereby being capable of enhancing the picture quality. Here, the uni-directional motion compensation unit 58 uses I frame or P frame stored in the frame buffer unit 57 as the standard frame.

Since IDCTed data is differential data between motion-compensated frame and the frame to be input, the adder 59 adds pixel values output from the 4×8 IDCT unit 54 and pixel values motion-compensated in the uni-directional motion compensation unit 58 to output it to the frame buffer unit 57. This is because that if data to be input is I frame, it is inversely quantized and IDCTed as it is, but, if P or B frame, differential data between motion-compensated data and data to be input is inversely quantized and IDCTed. At this time, if the I frame has been stored in the first frame area 57-1 of the frame buffer 57, the P frame output from the adder 59 is stored in the second frame area 57-2. And, the frame (e.g., I or P frame) to be next input to the frame buffer 57 is stored again in the first frame area 57-1 where I frame was stored. As mentioned above, the first and the second frame areas 57-1 and 57-2 alternatively store the frame to be input. Accordingly, the I frame and P frame may respectively be stored in the first and the second frame areas 57-1 and 57-2 of the frame buffer unit 57, and also two sequential P frames are respectively therein.

And, the P frame stored in the second frame area 57-2 of the frame buffer unit 57 is input to the multiplexer 72 through the LPF and vertical ½ decimation unit 71 of the format selecting unit 70 and simultaneously with this, is directly input to the multiplexer 72. The LPF and vertical ½ decimation unit 71 performs vertical ½ decimation after low pass filtering the P frame to be input.

On the other hand, if data to be IDCTed in the 4×8 IDCT 54 is the B frame, I frame and P frame, or, two P frames which are respectively stored in the first and the second frame areas 57-1 and 57-2 of the frame buffer are input to the LPF 60. The LPF unit 60 performs the low pass filtering for two frames to be input (i.e., I frame and P frame, or, two P frames) to output them to the bi-directional motion compensation unit 61.

At this moment, frames read from the frame buffer 57 may directly be output to the bi-directional motion compensation unit 61 without passing through the LPF unit 60, and may be output to the bi-directional motion compensation unit 61 after filtering through the LPF unit 60. In the latter case, a frequency aliasing phenomenon of the B frame can be prevented.

The bi-directional motion compensation unit 61 performs a quarter-pixel motion compensation in the direction of x using FMV' and BMV' scaled in the motion vector scaling unit 56 and frames filtered in the LPF 60, and performs a half-pixel motion compensation in the direction of y.

At this time, upon the motion compensation of the bi-directional compensation unit 61 as the uni-directional motion compensation unit 59, the DCT coefficient corresponding to the horizontal frequency discarded upon the filtering of the inverse scanning and filtering unit 52 is input as additional information, and the compensation is performed by macro blocks. In the same manner, the interpolation order is determined upon the data interpolation for the bi-directional motion compensation by analyzing the DCT coefficient discarded from the inverse and filtering unit 52.

And, the bilinear interpolation in general spatial interpolation methods is used upon the motion compensation of the uni-directional motion compensation unit 59 and bi-directional motion compensation unit 61, however, a polynomial compensation having much excellent capacity, rational function compensation, cubic spline compensation or bicubic compensation, etc., may be used.

Further, when data to be IDCTed is B frame, the 4×4 converting unit 62 inputs 4×8 pixel values for the B frame from the 4×8 IDCT unit 54 under the control of the controlling unit 55, and vertically sub samples them to the 4×4 blocks to output them to the adder 63.

The adder 63 adds the sub sampled 4×4 pixel values and pixel values which were bi-directionally motion-compensated in the bi-directional motion compensation unit 61, and after that, stores them in the B frame 64. Here, in the B frame instead of the 4×8 IDCT unit 54 and 4×4 converting unit 62, 4×4 filtering and 4×4 IDCT may be performed.

Meanwhile, the format selecting unit 70 vertically decimates in half I or P frame to be input according to the display format after the low pass filtering it, or, outputs it as it is without vertical ½ decimation or filtering and decimation, and for easily performing the interlacing function in the format converting unit connected to the rear part, if the display format is the interlaced scanning Int, a multiplexer 72 selectively outputs the I or P frame of the LPE and vertical ½ decimation unit 71. For example, if the signal to be input for the decoding is 1920×1080 30 Hz interlaced scanning method and the display format is 852×480 30 Hz interlaced scanning, the horizontal ½ down sampling has to be performed through the inverse scanning and filtering unit 52, and the vertical ½ down sampling has to be performed through the vertical ½ decimation unit 71.

Figure 6:
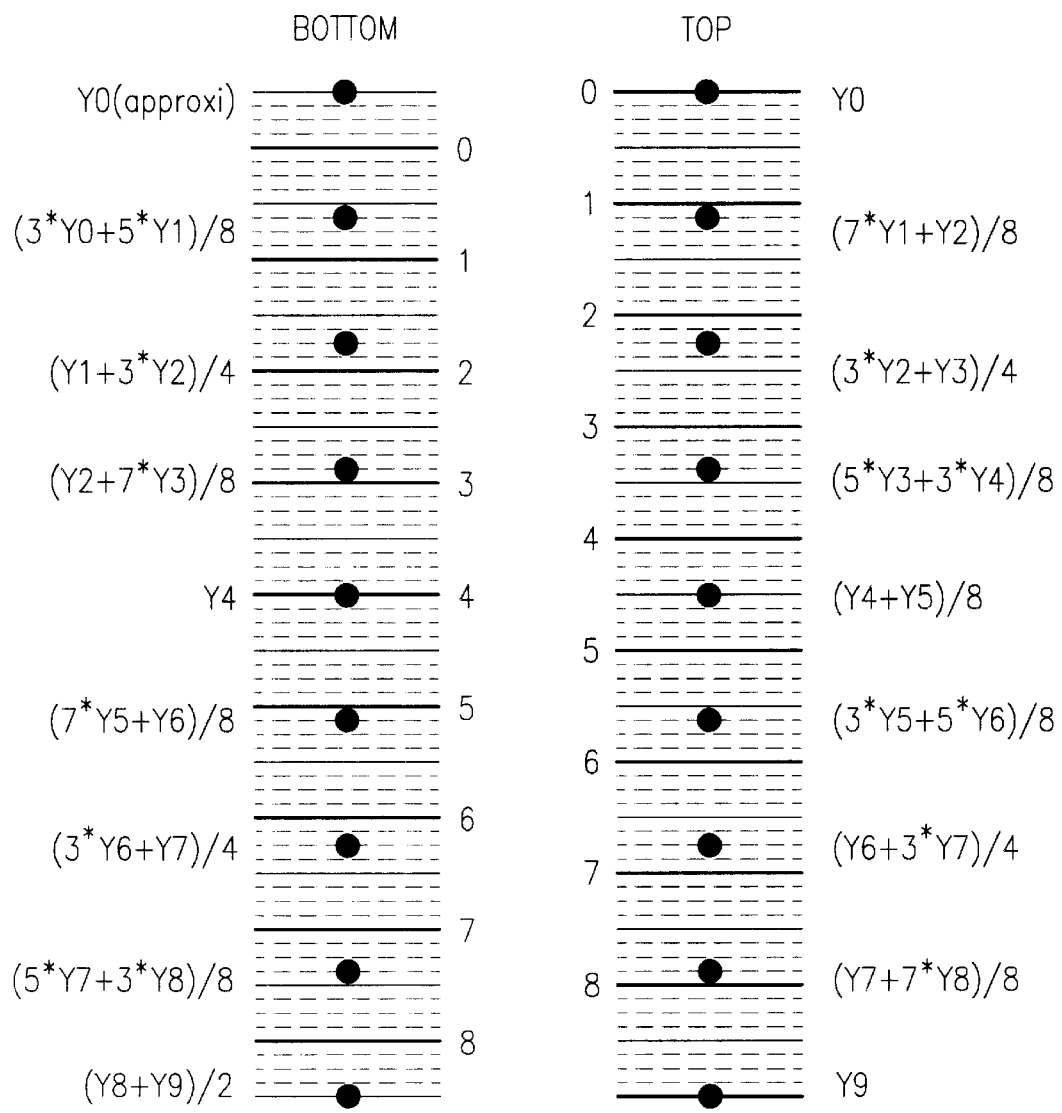
FIG. 6 is a diagram showing a pixel state of a brightness signal in case that a decoding format is interlaced scanning and a display format is a sequential scanning.

And, if the display format is sequential scanning Pro, the multiplexer 72 selectively outputs the I or P frame of the frame buffer 57. For example, in case that the signal to be input for the decoding is 1920×1080 30 Hz interlaced scanning method, if it is directly output without the vertical filtering and ½ decimation in the LPF and vertical ½ decimation unit 71, it becomes 960×540. This is because that one frame is comprised of a bottom field and a top field. Therefor, in case that the display format is 852×480 60 Hz sequential scanning, the vertical filtering and ½ decimation are not performed. And, if the format conversion unit performs a first interpolation which vertically selects only eight pixels in nine pixels without an additional interlacing process, 960×480 60 Hz sequential scanning is performed. At this time, as in FIG. 6, pixels of two fields are crossed due to the characteristics of the bottom field and the top field and therefor, positions thereof have to be changed so that the pixels of the bottom field and the pixels of the top field may coincide after the first interpolation. Further, the first interpolation is horizontally performed, thereby obtaining 852×480 60 Hz sequential scanning picture.

At present, the display device is in a trend of applying the sequential scanning and therefor, the present invention will usefully be used.

In the conventional device, even though the input format is the interlaced scan and the display format is sequential scan, vertical filtering and vertical ½ decimation are unconditionally performed and after that, the interlacing is performed in the format conversion unit. Thereby, the picture quality is deteriorated and also, additional memories are required in the format conversion unit. (Generally, three frames are required.) However, In the present invention, in case that the display format is the sequential scan, the vertical filtering and decimation are not required. As a result, the picture quality is enhanced and also, since the format conversion unit performs the only first interpolation for the I or P frame without the additional interlacing process, the size of the memory in the format conversion unit is reduced. That is, through the present invention, in case that the display format is the sequential scanning, the interfacing process for the I or P frame is performed in the decoder.

As discussed previously, the inventive down conversion decoding device of the digital television has an effect capable of obtaining a picture of the high quality no less than that of the full-memory version while reducing the size of the memory, by changing the size of the required memory according to the type of the frame to be input after the DCT coefficients are horizontally filtered. Further, the present invention has an effect of enhancing the picture quality by using the coefficients discarded through the horizontal filtering for determining the interpolation order upon the motion compensation.

Furthermore, in the present invention has advantages, if the display format is the sequential scanning, there is no need to perform the vertical filtering and decimation for the I and P frames and thereby, the format conversion unit can perform the only first interpolation without the additional interlacing process. As a result, the present invention has an effect capable of reducing the size of the memory in the format conversion unit and also, enhancing the picture quality due to there being a little vertical part to be discarded.

It will be apparent to those skilled in the art that various modifications and variations can be made in a method and system for providing a down conversion decoding device of a digital television of the present invention without departing from the spirit or scope of the invention. Thus, it is intended that the present invention cover the modifications and variations of this invention provided they come within the scope of the appended claims and their equivalents.

What is claimed is:

1. A down conversion decoding device of a digital television that receives an input bit stream comprising:
    an input signal processing unit that decodes discrete cosine transform (DCT) coefficients of the input bit stream and motion vectors, and performs inverse quantization and inverse discrete cosine transform for a subset that is less than all the DCT coefficients after inversely scanning said decoded discrete cosine transform coefficients;
    a frame storing unit having different sizes according to a characteristic of an input frame, and storing motion compensated frames; and
    a motion compensation unit that compensates motion of the frame stored in said frame storing unit according to type of motion vectors decoded in said input signal processing unit, remaining DCT coefficients not in the subset and inverse discrete cosine transformed frame.

2. The down conversion decoding device as claimed in claim 1, wherein said input signal processing unit comprises:
    a variable length decoding unit decoding said all the discrete cosine transform coefficients, forward motion vector and backward motion vector in a received compressed bit stream, and outputting them;
    an inverse scanning and filtering unit inversely scanning the discrete cosine transform coefficients decoded in said variable length decoding unit, leaving only discrete cosine transform coefficients corresponding to a low frequency part in inversely scanned discrete cosine transform coefficients, and discarding the remaining coefficients of a high frequency part;
    an inverse quantization unit inputting discrete cosine transform coefficient corresponding to the left low frequency part in said inverse scanning and filtering unit to quantize them; and
    an inverse discrete cosine transform unit performing inverse discrete cosine transform for discrete cosine transform values quantized in said inverse quantization unit, and converting them to spatial pixel values to output them.

3. The down conversion decoding device as claimed in claim 2, wherein said inverse scanning and filtering unit leaves discrete cosine transform coefficients of 4=8 part corresponding to a horizontal low frequency part in said inversely scanned 8=8 discrete cosine transform coefficients, and outputs the remaining high frequency part to said motion compensation unit.

4. The down conversion decoding device as claimed in claim 2, wherein said inverse discrete cosine transform unit inputs inversely quantized 4×8 discrete cosine transform values to perform 4×8 inverse discrete cosine transform.

5. The down conversion decoding device as claimed in claim 2, wherein said inverse discrete cosine transform unit collects two horizontal 8×8 blocks to respectively perform 8×8 inverse discrete cosine transform for them, performs 16×8 discrete cosine transform and after that, performs a filtering.

6. The down conversion decoding device as claimed in claim 1, wherein said frame storing unit is comprised of: a first frame buffer inputting I frame in frames output from said input signal processing unit, or, adding coefficient values of P frame output from said input signal processing unit to pixel values uni-directionally motion-compensated in said motion compensation unit to store them; and a second frame buffer adding pixel values bi-directionally motion-compensated in said motion compensation unit and 4×4 coefficient values of B frame output from said input signal processing unit to store them, and, outputting them.

7. The down conversion decoding device as claimed in claim 6, wherein said first frame buffer uses a half-memory version.

8. The down conversion decoding device as claimed in claim 6, wherein said first frame buffer divided into plural frame areas, and stores frame to be alternatively input.

9. The down conversion decoding device as claimed in claim 6, wherein said second frame buffer uses a quarter-memory version.

10. The down conversion decoding device as claimed in claim 6, wherein said motion compensation unit is comprised of: a uni-directional motion compensation unit compensating a motion with the forward motion vector output from said input signal processing unit and a standard frame stored in said frame buffer; bi-directional motion compensation unit compensating the motion with the forward motion vector and backward motion vector output from said input signal processing unit and frames I and P or two P frames stored in said frame buffer; and a 4×4 transform unit sub sampling 4×8 coefficient of the B frame output from said input signal processing unit to 4×4 coefficient to output it.

11. The down conversion decoding device as claimed in claim 10, wherein said uni-directional motion compensation unit determines an interpolation order using discrete cosine transform coefficient of the horizontal high frequency part from the remaining DCT coefficients not in the subset that were discarded from said inverse scanning and filtering unit.

12. The down conversion decoding device as claimed in claim 10, wherein said uni-directional motion compensation unit compensates the motion using the forward motion vector and backward motion vector output from said input signal processing unit and I frame or P frame stored in the frame buffer.

13. The down conversion decoding device as claimed in claim 10, wherein said uni-directional motion compensation unit scales the forward motion vector output from said input signal processing unit, and uses the scaled forward motion vector for the motion compensation.

14. The down conversion decoding device as claimed in claim 13, wherein said forward motion vector performs scaling only horizontally.

15. The down conversion decoding device as claimed in claim 10, wherein said uni-directional motion compensation up-samples the standard frame instead of scaling the forward motion vector output from said input signal processing unit, and uses up-sampled standard frame for the motion compensation.

16. The down conversion decoding device as claimed in claim 10, wherein said bi-directional motion compensation unit determines the interpolation order using the discrete cosine transform coefficients of the horizontal and vertical high frequency parts from the remaining DCT coefficients not in the subset that were discarded from said inverse scanning and filtering unit.

17. The down conversion decoding device as claimed in claim 10, wherein said bi-directional motion compensation unit scales the forward motion vector and backward motion vector output from said input signal processing unit to use them for the motion compensation.

18. The down conversion decoding device as claimed in claim 17, wherein said forward motion vector and backward motion vector are scaled only horizontally.

19. The down conversion decoding device as claimed in claim 17, wherein said bi-directional motion compensation unit up-samples the standard frame instead of scaling the forward motion vector and backward motion vector output from said input signal processing unit to use them for the motion compensation.

20. The down conversion decoding device as claimed in claim 10 further comprised of a low pass filter performing a low pass filtering vertically to plural frames stored in said frame buffer, and outputting it to said bi-directional motion compensation unit.

21. The down conversion decoding device as claimed in claim 20, wherein said plural frames input to said low pass filter are frames I and P, or, two sequential frames P and P.

22. The down conversion decoding device as claimed in claim 10 further comprised of additional 4×4 filtering and inverse discrete cosine transform unit instead of said 4×8 inverse discrete cosine transform unit and 4×4 transform unit, in case that the frame to be input is B frame.

23. The down conversion decoding device as claimed in claim 1 further comprised of a format selecting unit vertically filtering a corresponding frame stored in said frame storing unit according to a display format, or, outputting it as it is.

24. The down conversion decoding device as claimed in claim 6, further comprised of a format selecting unit vertically filtering a corresponding frame stored in said frame storing unit according to a display format, or, outputting it as it is, wherein said format selecting unit comprises:
a low pass filtering and decimation unit performing a low pass filtering for I or P frame data output from said frame buffer to perform a vertical decimation; and
a selecting unit selecting an output of said low pass filtering and decimation unit if the display format is an interlaced scanning method, and selecting an output of said frame buffer if said display format is a sequential scanning method to output the decoded I or P frame.

25. A down conversion decoding device of a digital television that receives an input bit stream comprising:
an input signal processing unit decoding received discrete cosine transform DCT coefficients of the input bit stream to be input and motion vectors and inversely scanning said decoded discrete cosine transform coefficients to perform inverse quantization and inverse discrete cosine transform for filtered ones being less than all the received DCT coefficients;
a frame processing unit having the memory of different sizes according to a characteristic of an input frame, compensating the motion of the frame stored in said memory according to a type of the motion vector decoded in said input signal processing unit and inverse discrete cosine transformed frame to store it in said memory;
a motion compensation unit that compensates motion of the frame stored in said memory according to remaining DCT coefficients other than the filtered ones and partial pixel values output by the input signal processing unit; and
a format selecting unit vertically filtering the corresponding frame stored in said frame processing unit according to a scanning method, or, outputting it as it is, wherein said format selecting unit comprises,
a low pass filtering and decimation unit performing a low pass filtering for I or P frame data output from said frame buffer to perform a vertical decimation; and
a selecting unit selecting an output of said low pass filtering and decimation unit if the display format is an interlaced scanning method, and selecting an output of said frame buffer if said display format is a sequential scanning method to output the decoded I or P frame.

26. A down conversion decoding device of a digital television that receives an input bit stream comprising:
input signal processing means for decoding discrete cosine transform (DCT) coefficients of the received input bit stream and motion vectors, and performing inverse quantization and inverse discrete cosine transform for a subset that is less than all the decoded DCT coefficients after inversely scanning said all decoded DCT coefficients;
frame storing means having different sizes according to a characteristic of an input frame, and for storing motion compensated frames; and
motion compensation means for compensating motion of the frame stored in said frame storing unit according to type of motion vectors decoded in said input signal processing means, remaining DCT coefficients not in the subset and inverse discrete cosine transformed frame.

27. A down conversion decoding device of a digital television comprising:
an input signal processing unit that decodes discrete cosine transform (DCT) coefficients and motion vectors of an input bit stream, wherein the input signal processor comprises,
an inverse scanner that inversely scans the decoded discrete cosine transform coefficients, and
a quantization and inverse DCT unit that performs quantization and DCT for a subset that is less than all the DCT coefficients output by the inverse scanner to transmit corresponding spatial pixel values;

a frame storing unit connected to the quantization and inverse DCT unit, wherein the frame storing unit has different sizes according to a characteristic of an input frame to store motion compensated frames, and wherein the frame storing unit comprises,
- a first frame storing unit connected to the inverse DCT unit sized to store two half-memory version I or P frames; and
- a second frame storing unit connected to the inverse DCT unit sized to store quarter-memory version B frames; and a motion compensation unit that compensates motion of the frame stored in said frame storing unit, wherein the motion compensation unit comprises,
- a first motion compensation unit connected between the frame storing unit and adder, wherein the first motion compensation unit receives remaining DCT coefficients not in the subset from the inverse scanner,
- a second bi-directional motion compensation unit connected between the first frame storing unit and second frame storing unit, wherein the second motion compensation unit receives the remaining DCT coefficients not in the subset from the inverse scanner, and
- a third quarter transform unit connected to the quantization and inverse DCT unit to output quarter-memory version B frames for the second frame storing unit; and a format selecting unit selectively vertically filtering a corresponding frame stored in the first frame storing unit according to a display format, wherein the format selecting unit comprises,
- a low pass filtering and decimation unit performing a low pass filtering for I or P frame data output from the first frame storing unit to perform a vertical decimation, and
- a selecting unit selecting one of an output of the low pass filtering and decimation unit for a prescribed display format and an output of the first frame storing unit otherwise to output the decoded I or P frame.

* * * * *